United States Patent
Mito

(10) Patent No.: US 6,990,500 B2
(45) Date of Patent: Jan. 24, 2006

(54) SCIENTIFIC INFORMATION INQUIRY-ANSWER SYSTEM, AND A HOST COMPUTER AND AN INQUIRING COMPUTER THEREFOR

(75) Inventor: Yasuhiro Mito, Kyotanabe (JP)

(73) Assignee: Shimadzu Corporation, Kyoto (JP)

( * ) Notice: Subject to any disclaimer, the term of this patent is extended or adjusted under 35 U.S.C. 154(b) by 1066 days.

(21) Appl. No.: 09/789,770

(22) Filed: Feb. 22, 2001

(65) Prior Publication Data

US 2002/0049769 A1    Apr. 25, 2002

(30) Foreign Application Priority Data

Oct. 19, 2000    (JP)    ............................. 2000-319671

(51) Int. Cl.
G06F 17/00    (2006.01)
G06F 7/00    (2006.01)
G06F 17/30    (2006.01)

(52) U.S. Cl. ........................... 707/104.1; 707/3; 707/5; 707/10

(58) Field of Classification Search ............. 707/104.1, 707/3, 5, 10
See application file for complete search history.

(56) References Cited

U.S. PATENT DOCUMENTS

| 5,819,273 | A | * | 10/1998 | Vora et al. | 707/10 |
| 5,873,076 | A | * | 2/1999 | Barr et al. | 707/3 |
| 6,350,066 | B1 | * | 2/2002 | Bobo, II | 709/206 |
| 6,665,666 | B1 | * | 12/2003 | Brown et al. | 707/5 |

* cited by examiner

Primary Examiner—Mohammad Ali
Assistant Examiner—Kuen S. Lu
(74) Attorney, Agent, or Firm—Rader, Fishman & Grauer PLLC

(57) ABSTRACT

In a system of this invention, an inquiring computer supplies a host computer with inquiry information indicated open or closed to third parties. The host computer applies inquiry information indicated open to a wide range of inquiring and answering computers, but does not apply inquiry information indicated closed to third party inquiring computers. Inquiry information indicated closed is applied to a small range including only the inquiring computer having inputted the inquiry information and answering computers. When answer search information is transmitted from the inquiring computer to the host computer, answer information supplied from an answering computer may be received through communication lines. Thus, the answer information for the inquiry information may be obtained efficiently while taking the security protection for the inquiry information presenting party into account.

19 Claims, 17 Drawing Sheets

Fig.12

| Title of inquiry | Neural Network |
| --- | --- |
| Contents of inquiry | We are planning to develop a calibration system on a three-layer neural network. Please recommend a suitable tool |
| Contents of answer | For the present, we recommend AAA, taking future system expansion into account. AAA is a product of BBB Company |
| Estimated price | 125,000 yen |
| Delivery term | Immediately |
| Vender name | Shimadzu |
| Vender address | Nakagyo-ku, Kyoto |
| Vender URL | http://www.shimadzu.co.jp |
| Vender e-mail address | mito@shimadzu.co.jp |

Fig.13

| Date of inquiry Click to open detailed pages | Title of inquiry | Contents of inquiry | Date of answer | Contents of answer | Vender name |
|---|---|---|---|---|---|
| 2000/09/12 | 2000/09/12 | We are planning to use a database in deducing two-dimensional structures of protein from DNA base sequences. We would like to build a system for motif searches and homology searches. Please recommend necessary software. | 2000/09/12 | Our CCC provides all systems. | Shimadzu |
| 2000/09/13 | 2000/09/13 | We are seeking software for visualizing three-dimensional structures of protein. We would like to use PDB file if possible. | 2000/09/13 | Software called XXXX seems suitable. Please access: http://www....com. | Shimadzu |
| 2000/09/13 | 2000/09/13 | We are seeking software for visualizing three-dimensional structures of protein. We would like to use PDB file if possible. | 2000/09/13 | ***** has an excellent reputation and is believed the best for your purpose. | MitosLab Systems |

SCIENTIFIC INFORMATION INQUIRY-ANSWER SYSTEM, AND A HOST COMPUTER AND AN INQUIRING COMPUTER THEREFOR

BACKGROUND OF THE INVENTION (1) Field of the Invention

This invention relates to a scientific information inquiry-answer system for presenting inquiry information and offering answer information for the inquiry information, through communication lines, concerning scientific information which is information relating to scientific fields, and a host computer and an inquiring computer for use with the system. In particular, the invention relates to a technique for efficiently obtaining answer information while taking the security protection for an inquiry information presenting party into account.

(2) Description of the Related Art

Scientific fields include various fields such as biology, chemistry, physics, medicine and so on, and cover extensive ranges. Numerous people engaged in the scientific fields (e.g. developing staffs of business enterprises, staffs of research institutions, and individual persons interested in science) use a computer system such as the Internet to retrieve and view information relating to the scientific fields (hereinafter called "scientific information" as appropriate), such as scientific/technical software, information regarding academic societies and exhibitions, advertisements, machinery and equipment, and so on.

Specifically, research institutions, business enterprises and the like operating in the scientific fields set up Web sites or home pages on the Internet to offer scientific information. People seeking information may directly access the Web sites through public telephone lines or other communication lines to obtain desired information. Tools such as search engines or mail magazines may also be used to obtain desired information.

However, it is difficult to obtain desired information efficiently through a conventional computer system.

The development of computer technology has produced overwhelming quantities of information. Since scientific fields cover extensive ranges, as many as several thousands to several tens of thousands of pieces of information may have to be viewed. It is very troublesome to check such information successively and determine whether the information is necessary or not.

On the other hand, an information seeker may access a particular site (e.g. a Web site on the Internet) presenting information in scientific fields, ask the person or company presenting the information questions concerning the information, and view the information after receiving answers directly. However, it is difficult to identify a site offering suitable information, and to obtain desired information efficiently. Use of the Internet, in particular, entails an additional problem that the party presenting inquiry information may be defenseless in terms of security.

SUMMARY OF THE INVENTION

This invention has been made having regard to the state of the art noted above, and its object is to obtain, efficiently, answer information for inquiry information presented while taking the security protection for the inquiry information presenting party into account.

The above object is fulfilled, according to this invention, by a scientific information inquiry-answer system comprising an inquiring computer for presenting, as distinguished between open and closed to third parties, inquiry information concerning scientific information which is information relating to scientific fields, and viewing the inquiry information and answer information, an answering computer for viewing the inquiry information and answer information and offering the answer information, and a host computer for storing the inquiry information and answer information, the computers being interconnected through communication lines, wherein:

the inquiring computer includes a first display/input device for inputting the inquiry information as distinguished between open and closed, inquiry search information for searching inquiry information, and answer search information for searching answer information, and displaying the inquiry information and answer information;

the answering computer includes a second display/input device for inputting the answer information, answer search information and inquiry search information, and displaying the inquiry information and answer information;

the host computer includes an open/closed determining device for determining a distinguishment between open and closed to third parties of the inquiry information and answer information, an information storing device for storing the inquiry information supplied from the inquiring computer and the answer information supplied from the answering computer, and an information retrieving device for retrieving answer information, based on the answer search information, from among the answer information stored, and retrieving inquiry information, based on the inquiry search information, from among the inquiry information stored;

the inquiring computer supplying the inquiry information, inquiry search information and answer search information inputted by the first display/input device to the host computer through one of the communication lines;

the answering computer supplying the answer information, answer search information and inquiry search information inputted by the second display/input device to the host computer through the other communication line;

the host computer applying, through the communication lines, inquiry information indicated open to the inquiring and answering computers, applying inquiry information indicated closed only to the inquiring computer having inputted the inquiry information and to the answering computer without applying such inquiry information to a third party inquiring computer, and applying answer information retrieved based on the answer search information to one of the inquiring computer and the answering computer having inputted the answer search information;

the host computer further applying answer information indicated open to the inquiring and answering computers, applying answer information indicated closed only to the inquiring computer having inputted the inquiry information and to the answering computer having inputted the answer information, without applying such answer information to third party inquiring and answering computers, and applying inquiry information retrieved based on the inquiry search information to the inquiring and answering computers;

the answering computer displaying the inquiry information and answer information applied thereto for viewing; and the inquiring computer displaying the inquiry information and answer information applied thereto for viewing.

With the system according to this invention, inquiry information inputted along with an open/closed indication by the first display/input device of the inquiring computer is applied from the inquiring computer to the host computer through the communication line. The inquiry information applied to the host computer is distinguished between open and closed by the open/closed determining device and stored in the information storing device. Of the inquiry information stored in the information storing device of the host computer, inquiry information indicated open is applied to both inquiring and answering computers. Inquiry information indicated closed is not applied to other inquiring computers, but applied only to the inquiring computer having inputted this inquiry information and to the answering computer.

The answering computer displays inquiry information based on inquiry search information inputted by the second display/input device and the information retrieving device of the host computer. Answer information inputted by the second display/input device is applied from the answering computer to the host computer through the communication line. The answer information applied to the host computer is stored in the information storing device.

When answer search information inputted by the first display/input device of the inquiring computer is applied from the inquiring computer to the host computer through the communication line, the information retrieving device of the host computer retrieves answer information corresponding to the answer search information. The answer information retrieved is promptly applied from the host computer to the inquiring computer through the communication line. The first display/input device of the inquiring computer displays the answer information for viewing. In this way, answer information is obtained for the inquiry information.

In the system of this invention, as described above, inquiry information is limited to inquiry information on scientific information, and answer information is supplied by inputting inquiry information and answer search information from the inquiring computer. Thus, answer information may be obtained efficiently. Further, inquiry information indicated open to third parties when inputted is given to a wide range of inquiring and answering computers, but inquiry information indicated closed to third parties is given to a small range including only the inquiring computer having inputted the inquiry information and answering computers. In this way, security is ensured for the party presenting inquiry information.

In this invention, one example of scientific information is software information which is information on software for use in scientific fields, and the inquiry information and answer information are information on the software information. In this case, since the inquiry information and answer information are information on software information, the inquiring party may obtain necessary software information efficiently while maintaining its confidentiality.

Other examples of scientific information include information on academic societies, information on exhibitions, information on advertisements, and information on machinery and equipment, and the inquiry information and answer information are information on the information on academic societies, exhibitions, advertisements, and machinery and equipment. In this case also, since the inquiry information and answer information are information on the information on academic societies, exhibitions, advertisements, or machinery and equipment, the inquiring party may obtain necessary information on academic societies, exhibitions, advertisements, or machinery and equipment efficiently while maintaining its confidentiality.

Preferably, the host computer includes a translating device for translating the scientific information into different languages. Scientific information, e.g. inquiry information and answer information, are translated into other languages by the translating device. Thus, scientific information such as inquiry information and answer information may be viewed or applied to the host computer not only in a home country but also in other countries. As a result, the system according to this invention may be used worldwide.

The information storing device, preferably, includes an open information storage area for storing inquiry information and answer information indicated open, and a closed information storage area for storing inquiry information and answer information indicated closed, the inquiry information and answer information being distributed to the open information storage area and the closed information storage area in response to results of distinguishment made between open and closed by the open/closed determining device, the inquiry information stored in each of the open information storage area and the closed information storage area being classified according to inquirer, the answer information being stored in the information storage area where the inquiry information to be answered is stored, and associated with the inquiry information to be answered. In this case, the inquiry information inputted from the inquiring computer is stored as classified according to open/closed and inquirer, and the answer information is stored as associated with the inquiry information to be answered. This storing arrangement greatly facilitates searches of the stored inquiry information made according to open/closed or inquirer, and searches for answer information corresponding to particular inquiry information.

Further, one preferred example of the information storing device stores the inquiry information as hierarchized according to each user having inputted the inquiry information, the inquiry information indicated closed and stored in the closed information storage area of the information storage device as hierarchized according to the user being applied, based on the inquiry search information inputted by the first and second display/input device from the answering computer and the inquiring computer of the user having inputted the inquiry information indicated closed, only to the answering computer and the inquiring computer without being applied to third party inquiring computers. In this case, a third party inquiring computer cannot retrieve or view the inquiry information indicated closed and stored in the closed information storage area. The user having inputted the inquiry information indicated closed may easily retrieve and view this inquiry information while maintaining its confidentiality. The answering computer may easily retrieve and view this inquiry information indicated closed.

Another preferred example of the information storing device stores the answer information as hierarchized at two levels of each user having inputted the inquiry information and a vender having inputted the answer information for the inquiry information, the answer information indicated closed and stored in the closed information storage area of the information storage device as hierarchized according to the user and the vender being applied, based on the answer search information inputted by the first and second display/input device from the inquiring computer of the user having inputted the inquiry information indicated closed, and the answering computer of the vender having inputted the answer information for the inquiry information indicated closed, only to the inquiring computer and the answering computer without being applied to third party inquiring and answering computers. In this case, a third party inquiring or answering computer cannot retrieve or view the answer information corresponding to the inquiry information indicated closed and stored in the closed information storage area. The user having inputted the inquiry information indicated closed and the vender having inputted the answer information for this inquiry information indicated closed may easily retrieve and view the answer information for the inquiry information while maintaining its confidentiality.

Preferably, each of the first and second display/input device comprises an information screen for displaying the inquiry information and answer information, the information screen being started and a log-in made by input operations through a keyboard and a mouse, a determination being made from the log-in inputted on the information screen whether the computer having started the information screen is the inquiring computer or the answering computer. In this case, depending on a log-in inputted, the computer having started the information screen acts as the inquiring computer or answering computer. Thus, the computer having started the information screen can easily be changed to the inquiring computer or answering computer according to purpose. The inquiring computer and answering computer in the system of this invention may have the same construction.

A host computer for use in the system of this invention comprises:

an open/closed determining device for determining a distinguishment between open and closed to third parties of the inquiry information and answer information;

an information storing device for storing the inquiry information supplied from the inquiring computer and the answer information supplied from the answering computer; and an information retrieving device for retrieving answer information, based on the answer search information, from among the answer information stored, and retrieving inquiry information, based on the inquiry search information, from among the inquiry information stored.

With this host computer, inquiry information indicated open and not requiring security protection is given to both answering and inquiring computers. Inquiry information indicated closed and requiring security protection is not given to third party inquiring computers, but given only to the inquiring computer having inputted this inquiry information and answering computers. The host computer retrieves answer information corresponding to the answer search information inputted from the inquiring computer, and applies the answer information to the inquiring computer requesting the search. As a result, the inquiring computer may efficiently obtain answer information for the inquiry information while ensuring security protection for the party presenting the inquiry information.

An inquiring computer for use in the system of this invention comprises a first display/input device for inputting the inquiry information as distinguished between open and closed, inquiry search information for searching inquiry information, and answer search information for searching answer information, and displaying the inquiry information and answer information.

With this inquiring computer, inquiry information is supplied to the host computer as distinguished between open and closed to third parties to take security into account. Answer search information is supplied to the host computer to retrieve and view corresponding answer information efficiently.

In a preferred display mode of the inquiring computer, the first display/input device comprises an information screen for displaying the inquiry information and answer information, the information screen being started by an input operation through a keyboard and a mouse to display the inquiry information and answer information for viewing. In this case, inquiry information and answer information may be viewed on the information screen corresponding to the first display/input device.

A preferred example of the information screen includes open/closed boxes for designating an open/closed status, one of the open/closed boxes being selected by operating the keyboard and mouse, when the inquiry information is inputted, to determine an open/closed status of the inquiry information. In this case, only by selecting one of the open/closed boxes with the keyboard or mouse, an open/closed status of the inquiry information inputted may easily be determined from the selected box.

As another preferred example of the information screen, a search is made for inquiry information matching inquiry search information, or for answer information matching answer search information, inputted on the information screen by operating the keyboard and mouse, and search results are displayed on the information screen. In this case, only by inputting inquiry search information or answer search information from the keyboard and mouse to the information screen, search results corresponding to the search information inputted may easily be displayed and viewed.

A further preferred example of the information screen includes an inquiry information input box for inputting inquiry information, an answer information search box for searching answer information based on answer search information, and an inquiry information search box for searching inquiry information based on inquiry search information, the boxes being selectable by operating the keyboard and mouse to input the inquiry information and search the answer and inquiry information. In this case, only by selecting an appropriate box with the keyboard and mouse, inquiry information may be inputted or a search may be made for answer information or inquiry information easily.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

FIG. 3 is a schematic view of a screen for inputting a password and the like;

FIG. 12 is a schematic view of a specific example of answer information input screen;

FIG. 13 is a schematic view of an answer search result display screen;

DESCRIPTION OF THE PREFERRED EMBODIMENTS

A preferred embodiment of this invention will be described in detail hereinafter with reference to the drawings.

Figure 1:
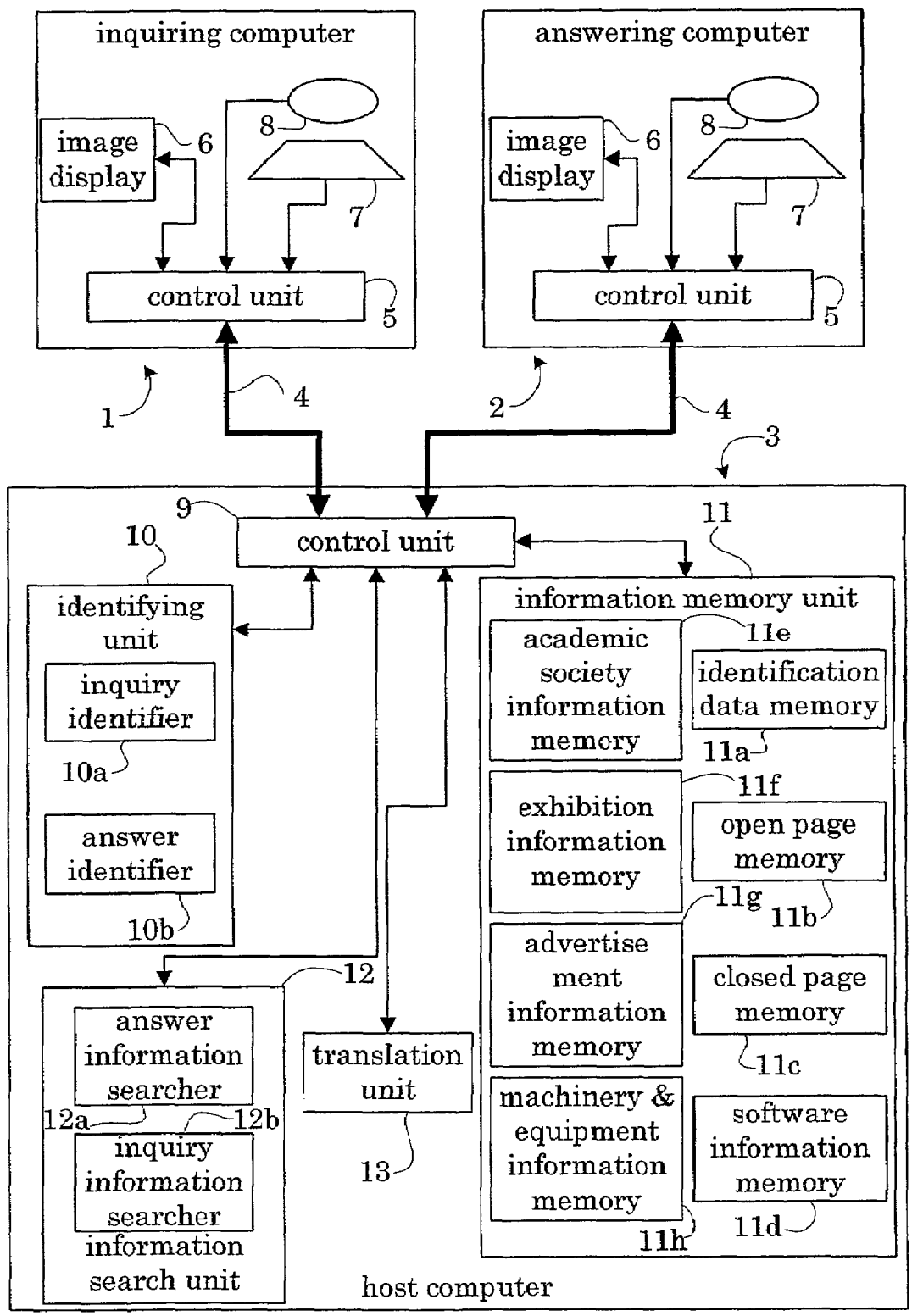
FIG. 1 is a block diagram of a principal portion of a scientific information inquiry-answer system according to this invention.

FIG. 1 is a block diagram of a principal portion of an information inquiry-answer system according to this invention. This system is constructed by using a host computer and inquiring computers embodying this invention.

As shown in FIG. 1, the system includes an inquiring computer 1, an answering computer 2 and a host computer 3 connected to one another through communication lines 4, typically through cables, signal lines and/or interfaces. The inquiring computer 1 is used to supply inquiry information concerning topics in the scientific fields, as distinguished between open and closed to third parties, and to view the inquiry information and answer information. The answering computer 2 is used to view the inquiry information and answer information and supply the answer information. The host computer 3 is constructed to collect and store the inquiry information and answer information.

Where the system uses the Internet, telephone lines act as the communication lines 4. Naturally, the system according to this invention may be constructed, for example, by using a local network instead of using the Internet.

In this system, the inquiring computer 1 and answering computer 2 are provided as separate from each other to avoid confusion. The two computers 1 and 2 have the same construction. Thus, either one of the computers may act as the inquiring computer 1 when used to supply inquiry information to the host computer 3, or as the answering computer 2 when used to supply answer information to the host computer 3. Of course, the two computers may have different constructions.

The information about which inquiries and answers are made in this system includes varied information relating to the scientific fields, such as software information which is information on software used in the scientific fields, information relating to academic societies, information relating to exhibitions, information relating to advertisements, and information relating to machinery and equipment. The system will be described hereinafter with emphasis placed on software information.

Each of the inquiring computer 1 and answering computer 2 includes a control unit 5 for supervising and controlling operation of the computer, a screen display unit 6 for displaying images on a monitor, and input devices such as a keyboard (console) 7 and a mouse (pointing device) 8. The screen display unit 6 of inquiring computer 1 displays varied information screens (first display/input device) used to input inquiry information as distinguished between open information and closed information, inquiry search information for searching inquiry information, and answer search information for searching answer information, and to display the answer information, answer search information and inquiry search information. The screen display unit 6 of answering computer 2 displays varied information screens (second display/input device) used to input the answer information and display the inquiry information.

Where the system is constructed by using the Internet, a browser acts as the information screens. When connected to the host computer 3, the browser is started to access an initial screen P1 described hereinafter, whereby the screen display unit 6 displays the initial screen P1 received through the communication line 4.

As shown in FIG. 1, the host computer 3 includes a control unit 9 for supervising and controlling operation of host computer 3, an identifying unit 10 for performing an identification process on varied information transmitted from the inquiring computer 1 or answering computer 2, an information memory unit 11 for storing varied information transmitted from the inquiring computer 1 or answering computer 2, an information search unit 12 for performing searches based on varied search information transmitted from the inquiring computer 1 or answering computer 2, and a translation unit 13. The identifying unit 10 corresponds to the open/closed determining device in this invention. The information search unit 12 corresponds to the information retrieving device in this invention. The translation unit 13 corresponds to the translating device in this invention.

As shown in FIG. 1, the information memory unit 11 includes an identification data memory 11a for storing identification information on inquiring and answering parties, an open page memory 11b for storing varied information classified as open, a closed page memory 11c for storing varied information classified as closed, and a software information memory 11d for storing software information. As shown in FIG. 1, the information memory unit 11 further includes an academic society information memory 12e for storing information relating to academic societies, an exhibition information memory 12f storing information relating to exhibitions, an advertisement information memory 12g for storing information relating to advertisements, and a machinery and equipment information memory 12h for storing information relating to machinery and equipment. The open page memory 11b and closed page memory 11c correspond to the information storing device in this invention. The open page memory 11b corresponds to an open information storage area in this invention. The closed page memory 11c corresponds to a closed information storage area in this invention.

The system of this embodiment will be described in detail with reference to information screens actually used.

Figure 2:
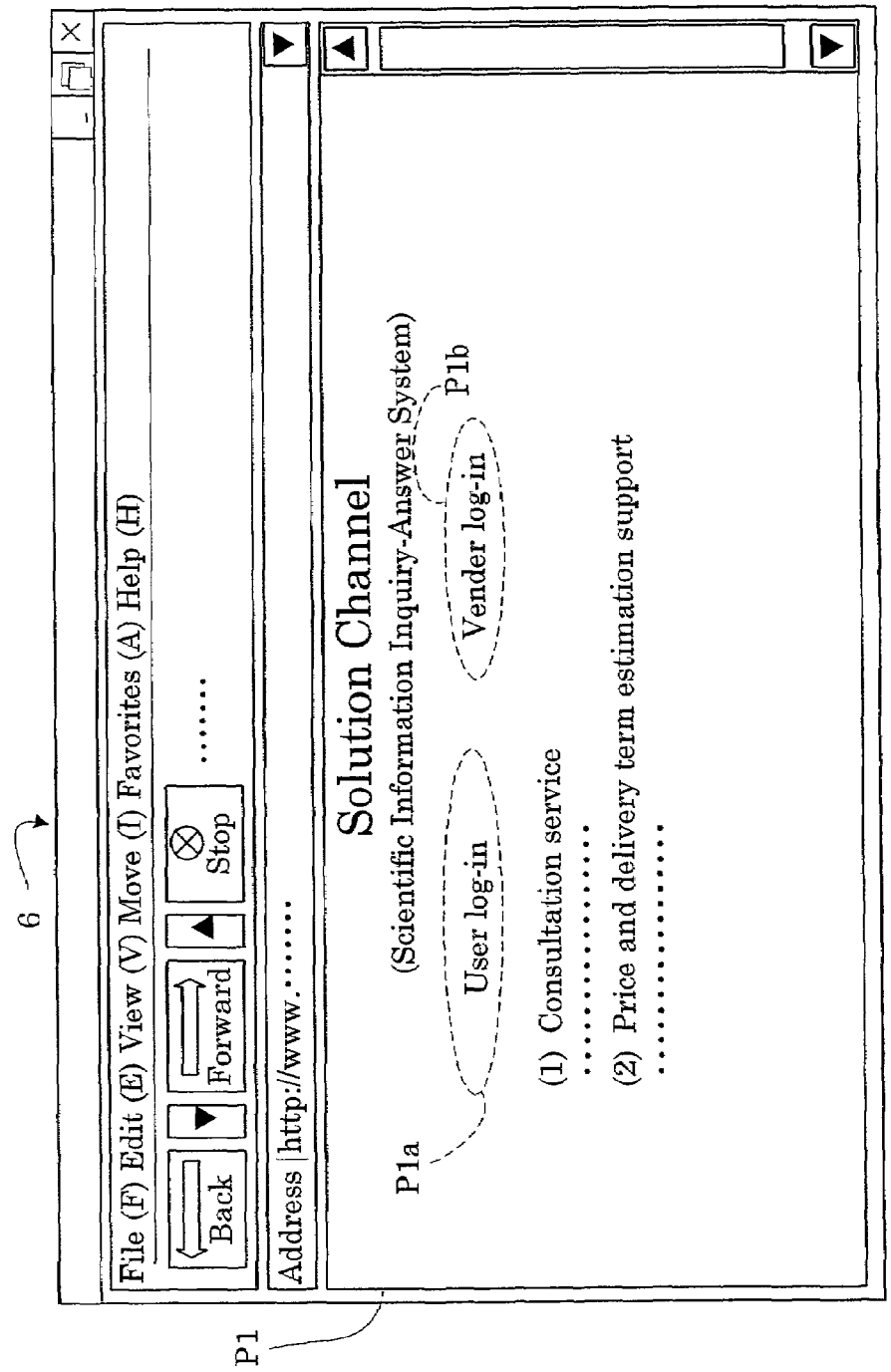
FIG. 2 is a schematic view of an initial screen used in the system.

When the system is started by the inquiring computer 1 connected to the host computer 3, an initial screen P1 is displayed by the screen display unit 6 as shown in FIG. 2. A selection is made on the initial screen P1 whether the access to the system (i.e. use) is a user log-in made by a user (inquirer) or a vender log-in made by a vender (answerer). The initial screen P1 includes two buttons, i.e. a user log-in button P1a and a vender log-in button P1b. When a user log-in is selected by clicking the mouse 8 on the user log-in button P1a, the host computer 3 recognizes the computer connected to the host computer 3 as the inquiring computer 1. When a vender log-in is selected by clicking on the vender log-in button P1b, the host computer 3, of course, recognizes the computer connected to the host computer 3 as the answering computer 2.

Figure 3:
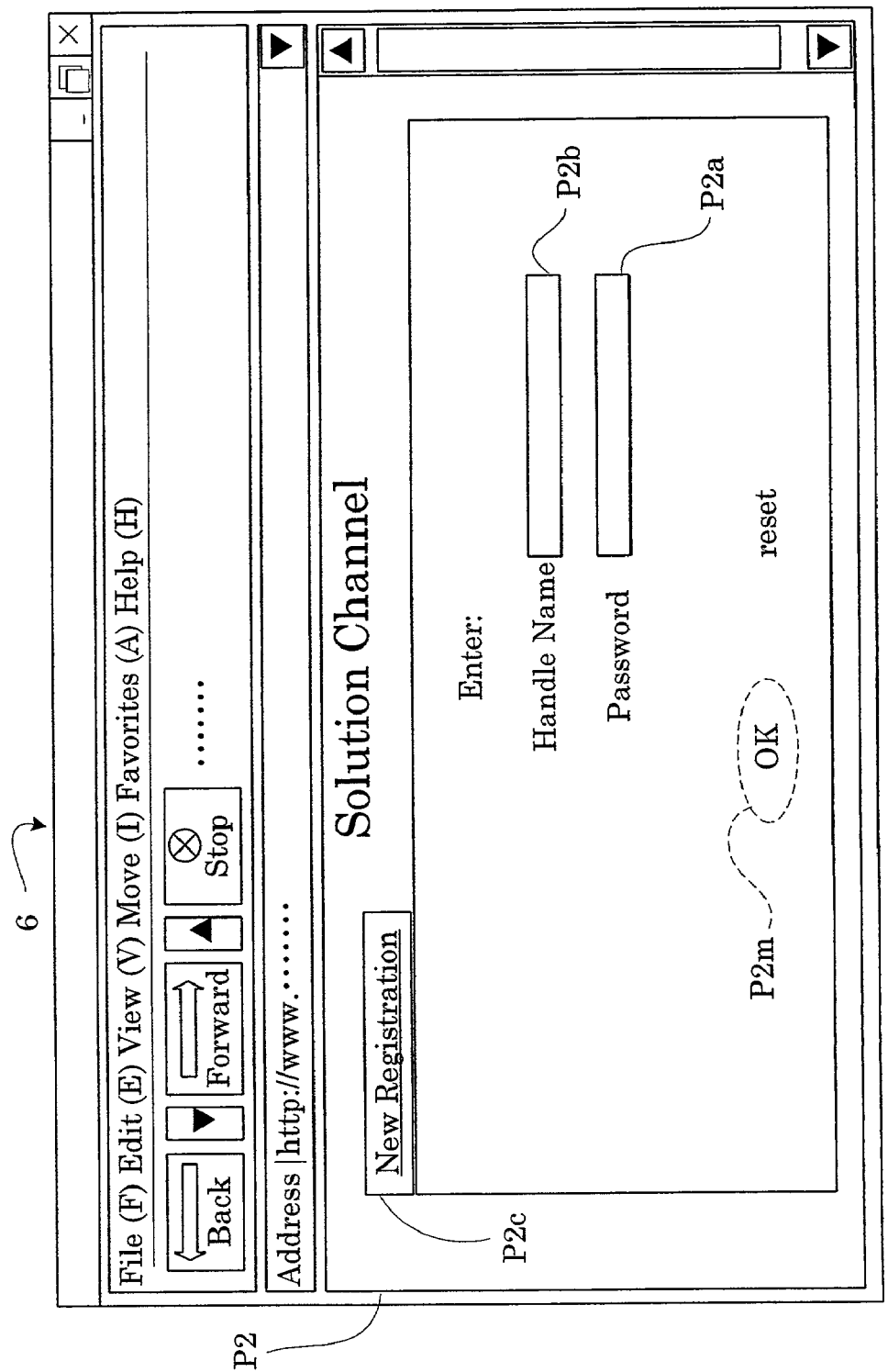
Figure 4:
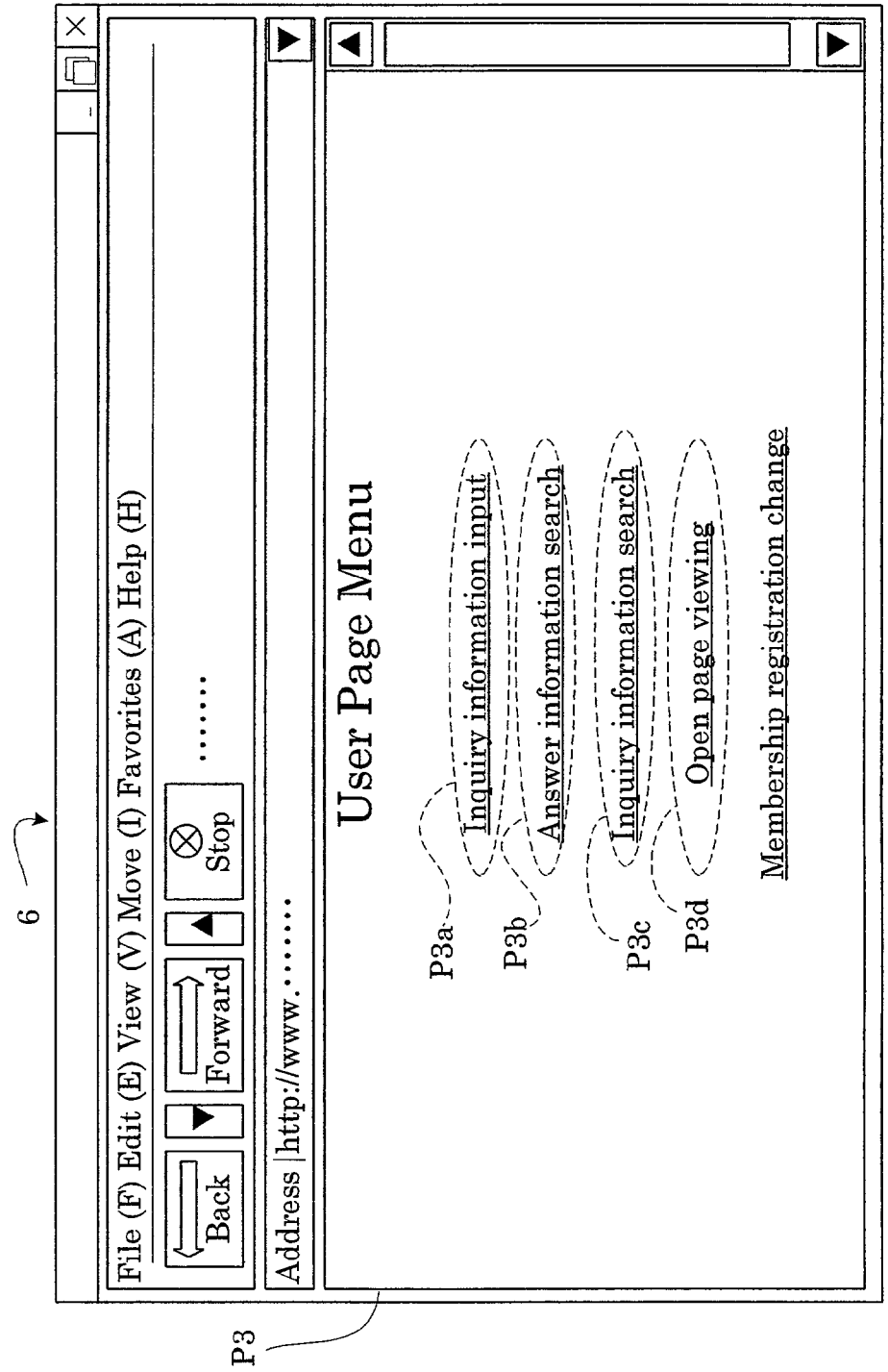
FIG. 4 is a schematic view of a user page menu screen.

When the user clicks on the user log-in button P1a on the initial screen P1, as shown in FIG. 3, the screen display unit 6 displays a screen P2 for inputting a password and the like. A registered user may type his or her password and handle name in a password input box P2a and handle name input box P2b on the screen P2 through the keyboard 7, and click on a send button P2m. Then, the inquiry identifier 10a of host computer 3 checks to determine whether the password and handle name inputted from the inquiring computer 1 coincide with those stored in the identification data memory 11a within the information memory unit 11. When the password and handle name are found to coincide with those already stored, as shown in FIG. 4, a user page menu screen P3 is displayed. The user can select a suitable option on the user page menu screen P3. The handle name used in this embodiment is a character string (such as alphabets and numerals) freely selected by the user. The user may select his or her alias (nickname) as the handle name. The password may also be a character string freely selected by the user.

When the password and handle name coincide with none of those already stored in the identification data memory 11a, an error message is displayed and the operation cannot proceed any further, of course.

Figure 5:
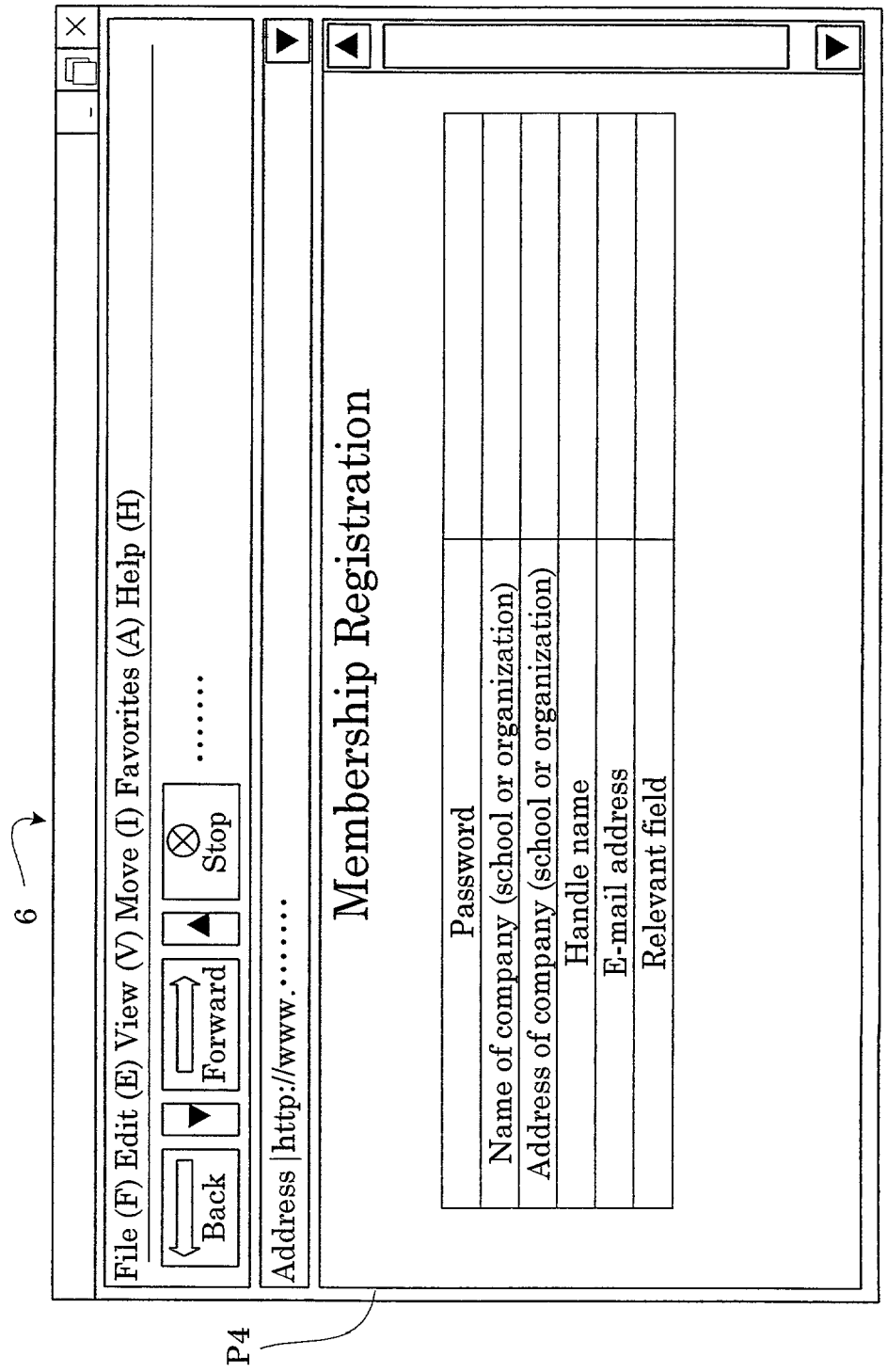
FIG. 5 is a schematic view of a membership registration screen.

When the user (inquiring party) is not registered as a member yet, a procedure for membership registration is carried out first. That is, the user clicks the mouse 8 on a "new registration" button P2c on the screen P2 for inputting a password and the like. Then, as shown in FIG. 5, the screen display unit 6 displays a membership registration screen P4 for the user to type identification data such as the user's name, password, organization, handle name, mail address and so on in input boxes on the screen. The identification data inputted are transmitted to the host computer 3 and stored in the identification data memory 11a within the information memory unit 11.

A vender (answering party) carries out the same procedure for membership registration as does the user. Identification data inputted are stored in the same identification data memory 11a.

Figure 6:
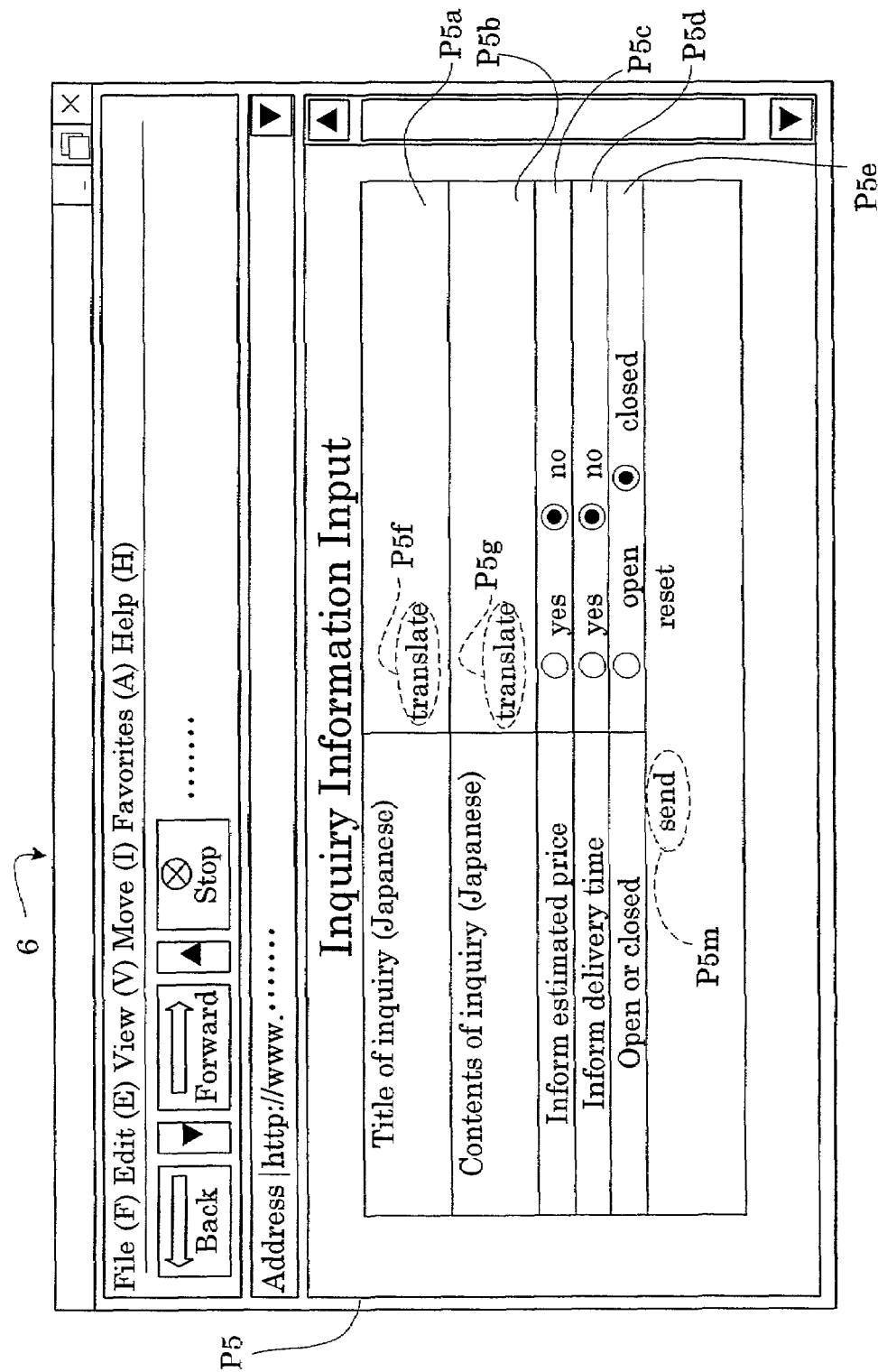
FIG. 6 is a schematic view of a screen for inputting inquiry information.

When transmitting inquiry information from the inquiring computer 1 to the host computer 3, the user clicks on an inquiry information input button P3a on the user page menu screen P3 to select an inquiry information input option. Then, as shown in FIG. 6, the screen display unit 6 displays an inquiry information input screen P5. The user types the title and contents in an inquiry title box P5a and an inquiry content box P5b, and clicks on appropriate buttons in an inform estimated price box P5c, an inform delivery term box P5d and an inquiry information open or closed box P5e. When translations of the title and contents of the inquiry are desired, the user may click on translate buttons P5f and P5g. Then, the translation unit 13 included in the host computer 3 will automatically translate the title and contents. When English translations are desired, for example, the translation unit 13 will automatically translate the title and contents into English. The inquiry information completed in this way is supplied to the host computer 3 through the communication line 4 by clicking on a send button P5m. The inquiry information may, for example, be information seeking scientific and technical software.

Figure 7:
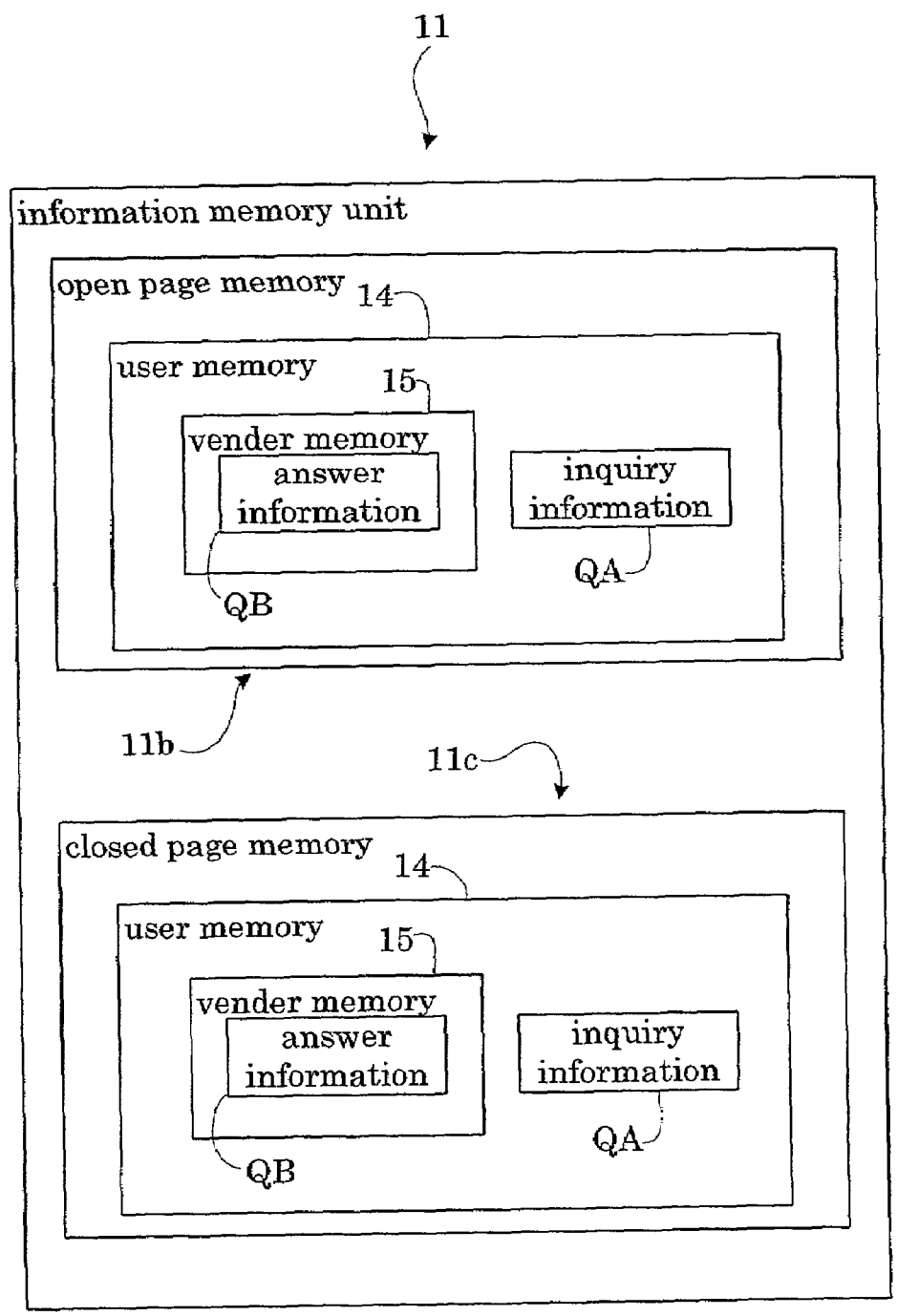
FIG. 7 is a schematic view of open and closed page memories in a host computer of the system.

In the host computer 3, the inquiry identification unit 10a checks the inquiry information open or closed box P5e to determine whether the information may be made open or must be closed to third parties. The inquiry information, when found open, is written to (i.e. stored in) the open page memory 11b, and when found closed, is written to the closed page memory 11c. In this case, as shown in FIG. 7, inquiry information QA, whether in the open page memory 11b or in the closed page memory 11c, is stored in an appropriate area in a user memory 14 hierarchized for each user.

The inquiry information stored in the open page memory 11b may be freely accessed and viewed by not only venders but also other users. However, the inquiry information stored in the closed page memory 11c is inaccessible to other users, and may be accessed and viewed only by the user having inputted the inquiry information and by venders (i.e. all venders). In the system of this embodiment, the inquiry identifier 10a determines whether accessing parties are venders or users, and prevents users from accessing other users' inquiry information in the closed page memory 11c.

When the user clicks on an answer information search button P3b on the user page menu screen P3, a search may be made for answer information (provided by venders as described hereinafter) for the inquiry information provided by the user currently making access. When the user clicks on an inquiry information search button P3c, a search may be made for inquiry information provided by the user currently making access. When the user clicks on an open page button P3d, a search may be made for the inquiry information and answer information stored in the open page memory. Of course, the inquiry information and answer information stored in the closed page memory may also be searched so long as such information is the inquiry information provided by this same user or answer information addressed to this inquiry information.

Figure 8:
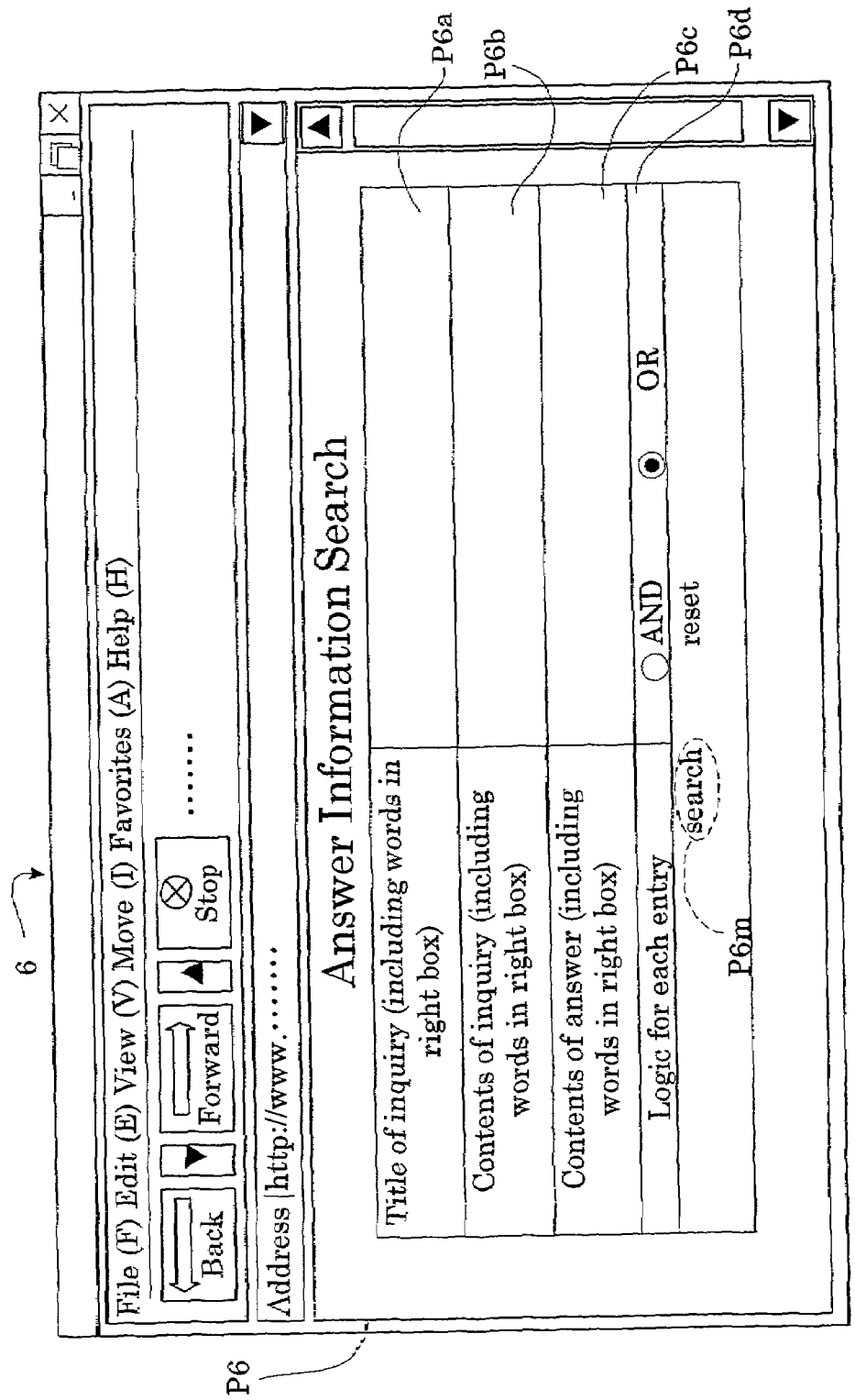
FIG. 8 is a schematic view of an answer information search screen.

For searching answer information, as shown in FIG. 8, the screen display unit 6 displays an answer information search screen P6. The user completes answer search information by typing or selecting and clicking on necessary items or options in an inquiry title input box P6a, an inquiry content input box P6b, an answer content input box P6c and a search logic (AND or OR) select box P6d. When the user clicks on a search button P6m, the answer search information is transmitted to the host computer 3 through the communication line 4.

Figure 9:
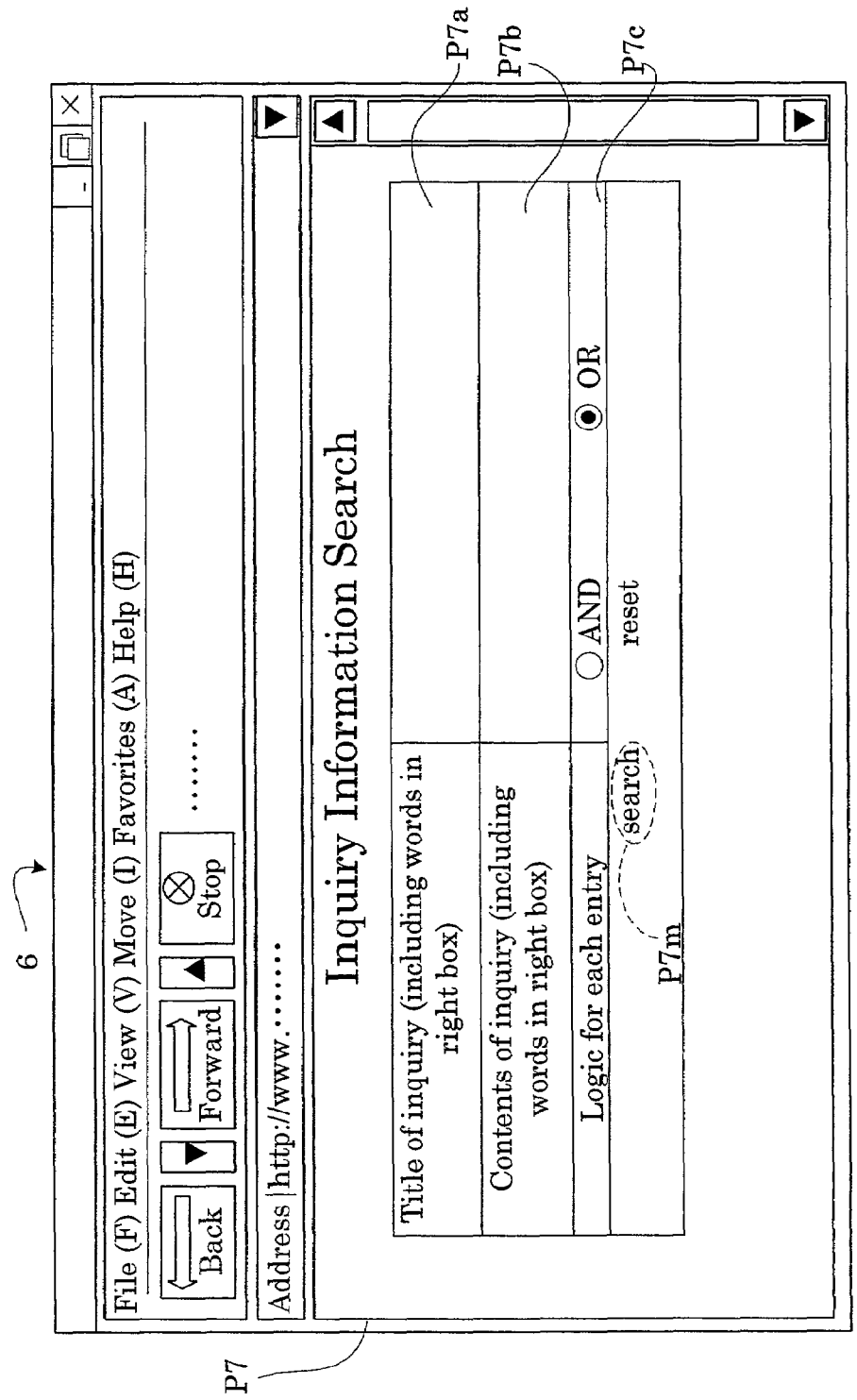
FIG. 9 is a schematic view of an inquiry information search screen.

For searching inquiry information, as shown in FIG. 9, the screen display unit 6 displays an inquiry information search screen P7. The user completes inquiry search information by typing or selecting and clicking on necessary items or options in an inquiry title input box P7a, an inquiry content input box P7b and a search logic (AND or OR) select box P7c. When the user clicks on a search button P7m, the inquiry search information is transmitted to the host computer 3 through the communication line 4.

When the user clicks on the search button P6m or P7m, with the boxes on the answer information search screen P6 or inquiry information search screen P7 left blank, search information for retrieving all answer information or inquiry information is transmitted to the host computer 3.

The system of this embodiment offers a keyword search for retrieving a limited range of answer information or inquiry information. This is performed by suitably selecting words inputted in the input boxes.

In the host computer 3 having received the answer search information or inquiry search information, the answer information searcher 12a searches and reads answer information from the closed page memory 11c based on the answer search information, and outputs the retrieved information through the communication line 4, or the inquiry information searcher 12b searches and reads inquiry information from the closed page memory 11c based on the inquiry search information, and outputs the retrieved information through the communication line 4. The inquiring computer 1 causes the screen display unit 6 to display the answer information or inquiry information for viewing.

The inquiry information and answer information stored in the open page memory may also be retrieved as described above. A search for inquiry information or answer information requested from the answering computer 2 may also be performed in the same way as a search for inquiry information or answer information requested from the inquiring computer 1.

Figure 10:
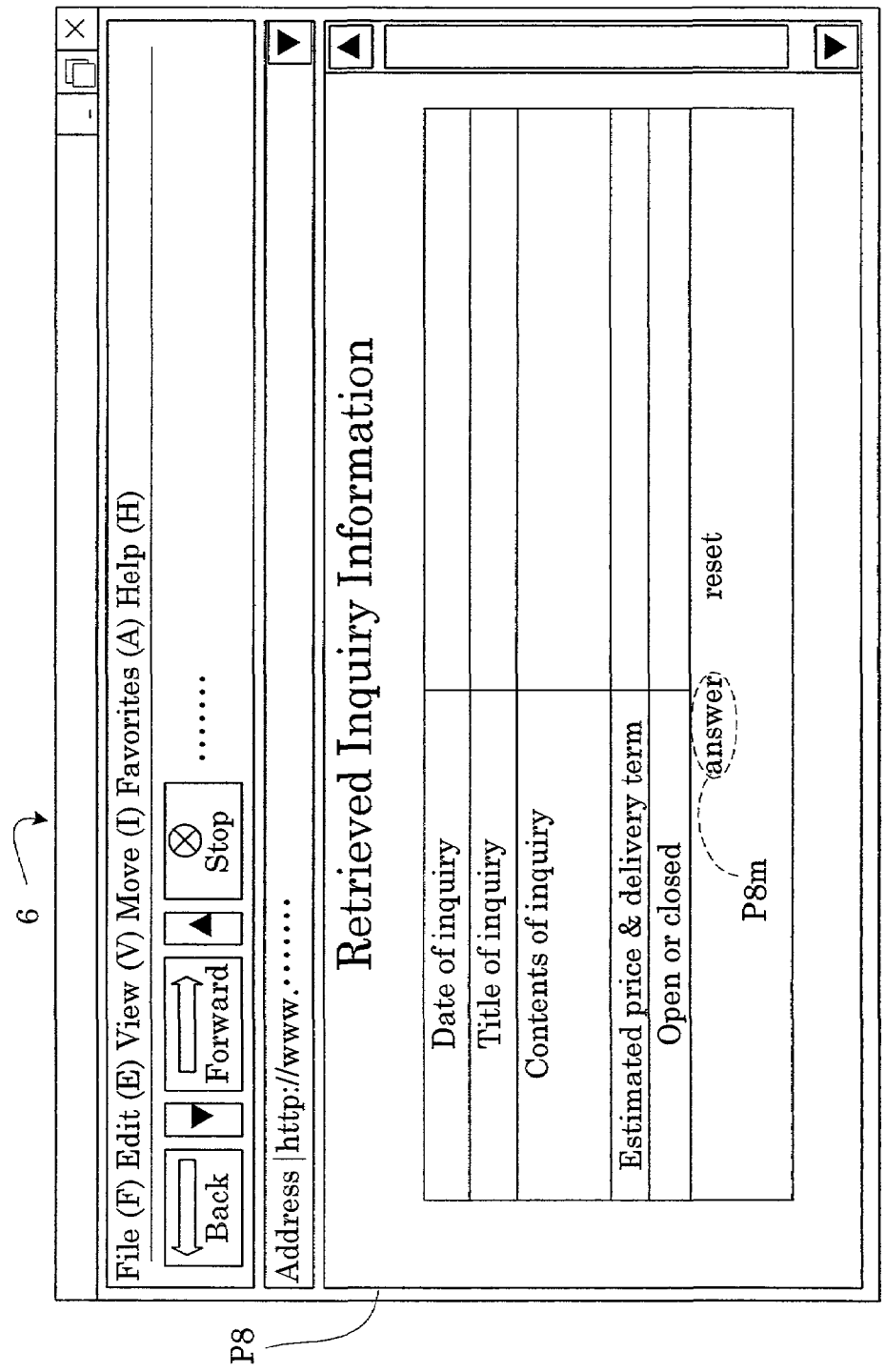
FIG. 10 is a schematic view of a retrieved inquiry information viewing screen.

That is, when retrieving and viewing inquiry information stored in the open page memory 11b or closed page memory 11c, a vender supplies inquiry search information from the answering computer 2 to the host computer 3, and reads necessary inquiry information through the communication line 4. As shown in FIG. 10, the screen display unit 6 displays a retrieved inquiry information viewing screen P8. When inquiry information that can be answered is found on the retrieved inquiry information viewing screen P8, the vender may prepare answer information and supply this information to the host computer 3. At this time, the vender can view all inquiry information on the open page and all inquiry information on the closed page. However, since only the handle name is presented on the retrieved inquiry information viewing screen P8, the user's private information, i.e. identification information, is unknown to the vender at the stage of viewing the inquiry information.

Figure 11:
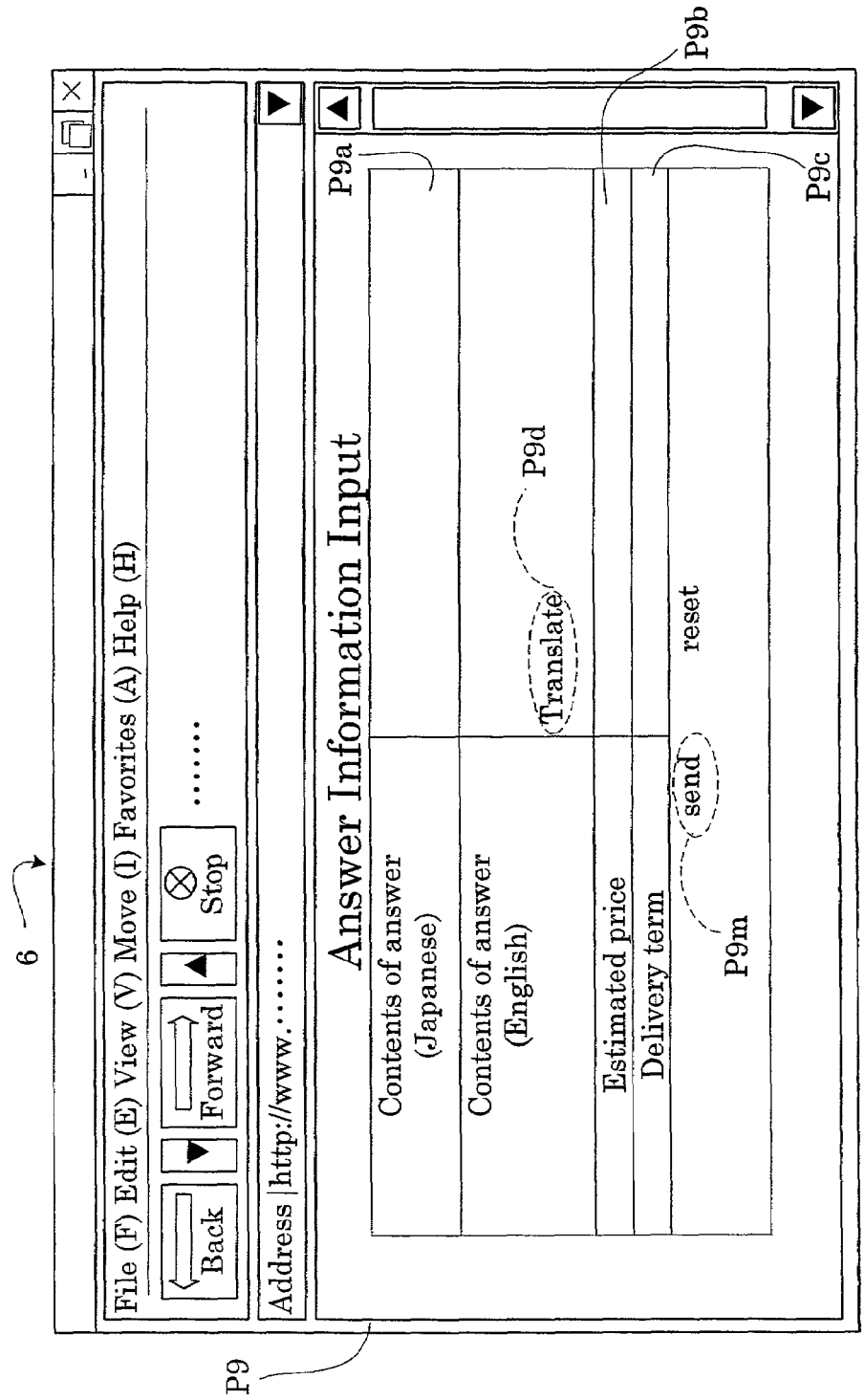
FIG. 11 is a schematic view of an answer information input screen.

For preparing answer information to be supplied, the vender clicks on an answer button P8m on the retrieved inquiry information viewing screen P8. Then, as shown in FIG. 11, the screen display unit 6 of answering computer 2 displays an answer information input screen P9. The vender types necessary matters in an answer content box P9a, an estimated price box P9b, a delivery term box P9c and so on. The system of this embodiment allows links, pictures and animated cartoons to be applied as contents of an answer. Where a translation of the answer information is required, the vender clicks on a translate button P9d. Then, the translation unit 13 of host computer 3 will automatically translate the answer information as in time of inquiry information. In this way, the translation unit 13 of host computer 3 translates inquiry information and answer information into a foreign language. Thus, scientific information such as inquiry information and answer information may be viewed or applied to the host computer 3 not only in a home country but also in other countries. As a result, the system of this embodiment may be used worldwide.

FIG. 12 shows a specific example of completed answer information input screen P10. When the vender clicks on a send button P9m, the answer information input screen P10 is transmitted as answer information from the answering computer 2 to the host computer 3 through the communication line 4. The answer information may, for example, introduce a specific product of scientific and technical software sought by the user.

In the host computer 3 having received the answer information from the answering computer 2, the answer identifier 10b determines whether the inquiry information answered is open or closed to third parties. When the inquiry information is found open, the answer information is written to the open page memory 11b. When the inquiry information is found closed, the answer information is written to the closed page memory 11c. As shown in FIG. 7, answer information QB, whether in the open page memory 11b or in the closed page memory 11c, is stored in an appropriate area in a vender memory 15 hierarchized for each vender within the user memory 14.

On the other hand, the user may search answer information in the open page memory 11b or closed page memory 11c from the inquiring computer 1, and view retrieved answer information displayed by the screen display unit 6. Of course, the user can retrieve only answer information relating to his or her own inquiry, among answer information stored in the closed page memory 11c, because of an identification process carried out by the answer identifier 10b. That is, as shown in FIG. 8, the user enters necessary items on the answer information search screen P6 displayed on the screen display unit 6 of inquiring computer 1, and transmits completed answer search information to the host computer 3. A search is made for all answer information stored in the open page memory 11b relating to other users' inquiry information also, for free viewing by the user. The host computer 3 outputs an answer search result display screen P11 as shown in FIG. 13, for example, as a search result to the inquiring computer 1 through the communication line 4.

The user views the answer search result display screen P11 displayed on the screen display unit 6 of inquiring computer 1. When suitable answer information is found, the user sends a message to the vender who has provided the suitable answer information. By clicking on the answer information on the answer search result display screen P11, details of the answer information are displayed on the screen display unit 6. The details include the vender's address to enable the user to send a message to the vender. The message may be transmitted by using the system of this embodiment, or by e-mail separately from the system of this embodiment.

Along with the message, the user's private information, i.e. identification information, is transmitted to the vender. Subsequently, transactions take place between the user and vender without using the system of this embodiment. By using a closed page in the system of this embodiment, necessary answer information may be obtained with no possibility of the user's private information being leaked until such a message is transmitted.

Further, in the system of this embodiment, as shown in FIG. 1, the information memory unit 11 includes the software information memory 11d for storing software information used in the scientific fields. This software information is offered by venders and transmitted from the answering computer 2 to the host computer 3 to be stored in the software information memory 11d. In the software information memory 11d, the software information is hierarchized according to field, category and product. Access may be made from the inquiring computer 1 to read the software information freely. If software information cited in answer information is stored in the software information memory 11d, the software information may be read from the software information memory 11d, and viewed to study the contents of the software information fully.

Figure 14:
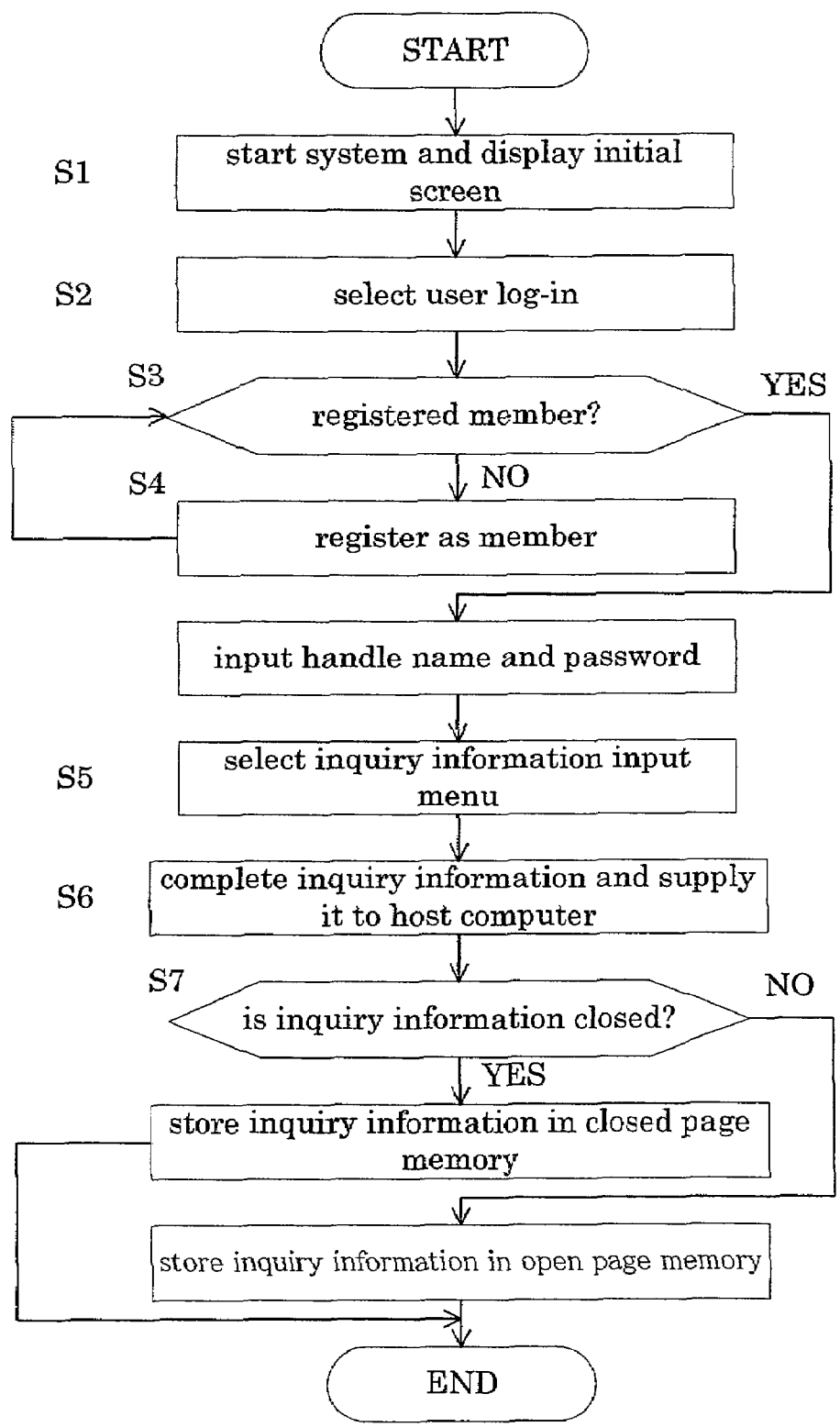
FIG. 14 is a flow chart of an inquiry information input process.

A typical example of scientific information inquiry and answer performed in the system of the above embodiment will be described in the order of an inquiry information input process, an answer information input process and an answer information retrieval process, with reference to the drawings. FIG. 14 is a flow chart of the inquiry information input process.

[Step S1] The user connects the inquiring computer 1 to the host computer 3 and starts the system. The initial screen P1 is displayed on the screen display unit 6 of inquiring computer 1.

[Step S2] The user log-in is selected on the initial screen P1. Then, the screen P2 for inputting a password and the like is displayed on the screen display unit 6.

[Step S3] The user, if already registered as a member, inputs his or her handle name and password on the screen P2. Then, the user page menu screen P3 is displayed on the screen display unit 6. If the user is not registered as a member yet, the operation proceeds to step 4.

[Step S4] The membership registration screen P4 is displayed on the screen display unit 6. After registering the user as a member, the operation returns to step 3.

[Step S5] The inquiry information input menu is selected on the user page menu screen P3. The inquiry information input screen P5 is displayed on the screen display unit 6.

[Step S6] Inquiry information QA is completed by making inputs on the inquiry information input screen PS, including an input as to whether the information is open or closed. The inquiry information QA completed is supplied to the host computer 3 through the communication line 4. It is assumed here that the inquiry information QA is closed.

[Step S7] The host computer 3 identifies the user and determines whether the inquiry information QA supplied is open or closed. Then, as shown in FIG. 7, the inquiry information QA is written to an appropriate area in the user memory 14 of closed page memory 11c. This completes the input of inquiry information from the inquiring computer 1.

Figure 15:
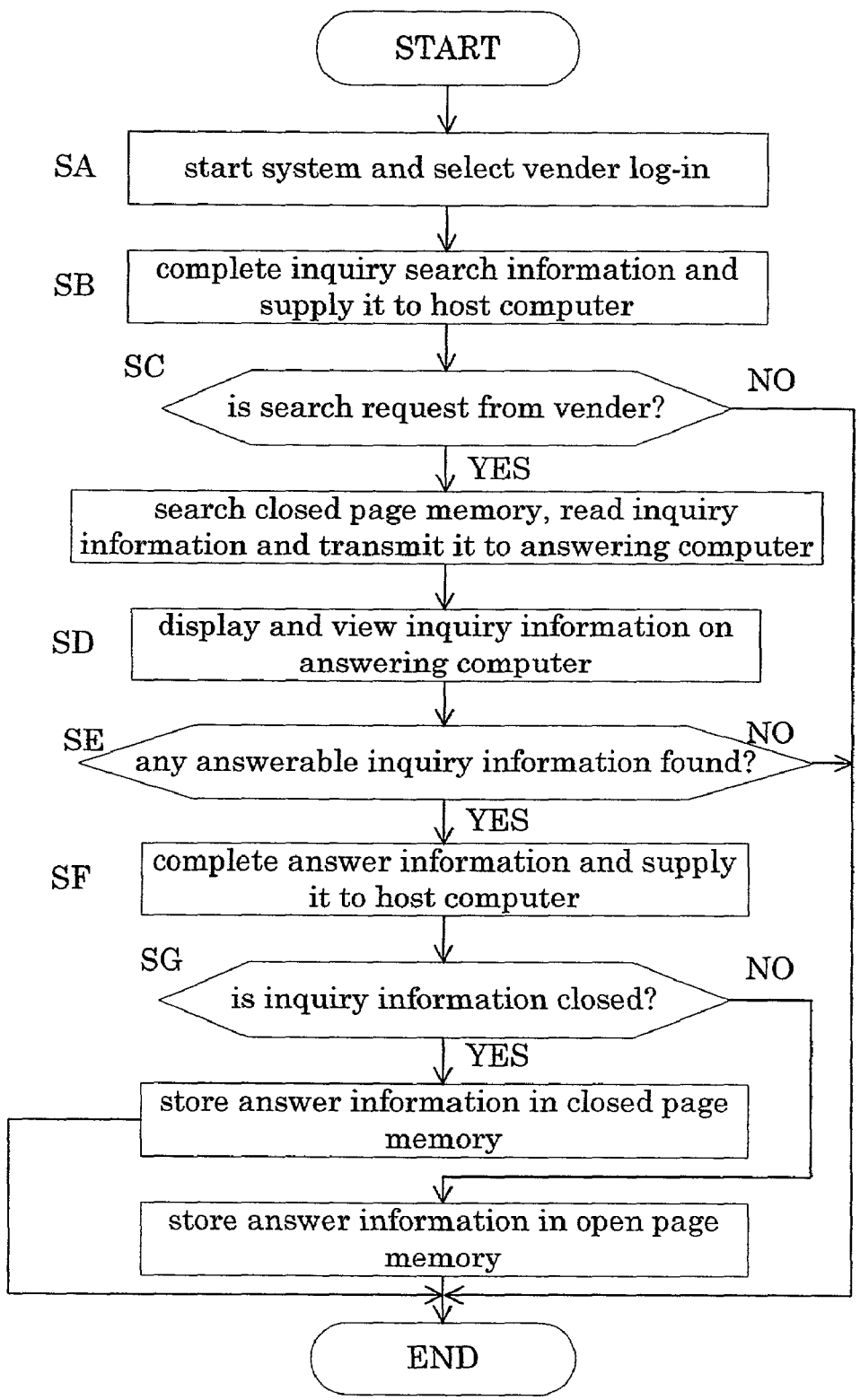
FIG. 15 is a flow chart of an answer information input process.

The answer information input process will be described next. FIG. 15 is a flow chart of the answer information input process.

[Step SA] The vender connects the answering computer 2 to the host computer 3. As in the case of the user log-in, a vender log-in is carried out. Then, the inquiry information search screen P7 is displayed on the screen display unit 6 of answering computer 2.

[Step SB] On the inquiry information search screen P7 the vender manually makes inputs required for searching the closed page memory 11c, to complete inquiry search information. The inquiry search information is supplied to the host computer 3 through the communication line 4. The inquiry search is assumed here to include the inquiry information QA as information to be retrieved.

[Step SC] The host computer 3 determines that the computer having supplied the inquiry search information is the answering computer 2 (vender side). The closed page memory 11c storing the inquiry information QA is searched based on the inquiry search information. The inquiry information retrieved (including the inquiry information QA) is transmitted to the answering computer 2 through the communication line 4.

[Step SD] The inquiry information retrieved is displayed and viewed on the screen display unit 6 of answering computer 2.

[Step SE] When the inquiry information QA that can be answered is found on the screen display unit 6, the vender causes the answer information input screen P9 to be displayed on the screen display unit 6 to prepare answer information. When no answerable inquiry information is found, the answer information input process is discontinued.

[Step SF] The vender inputs necessary matters on the answer information input screen P9. After completing answer information QB for the inquiry information QA, the answer information QB is supplied to the host computer 3 through the communication line 4.

[Step SG] The host computer 3 determines whether the inquiry information QA for which the answer information QB has been supplied is open or closed, and identifies the user who has supplied the inquiry information QA and the vender who has responded thereto. Then, as shown in FIG. 7, the answer information QB is written to an appropriate area in the vender memory 15 within the user memory 14, where the inquiry information QA is stored, of closed page memory 11c.

Figure 16:
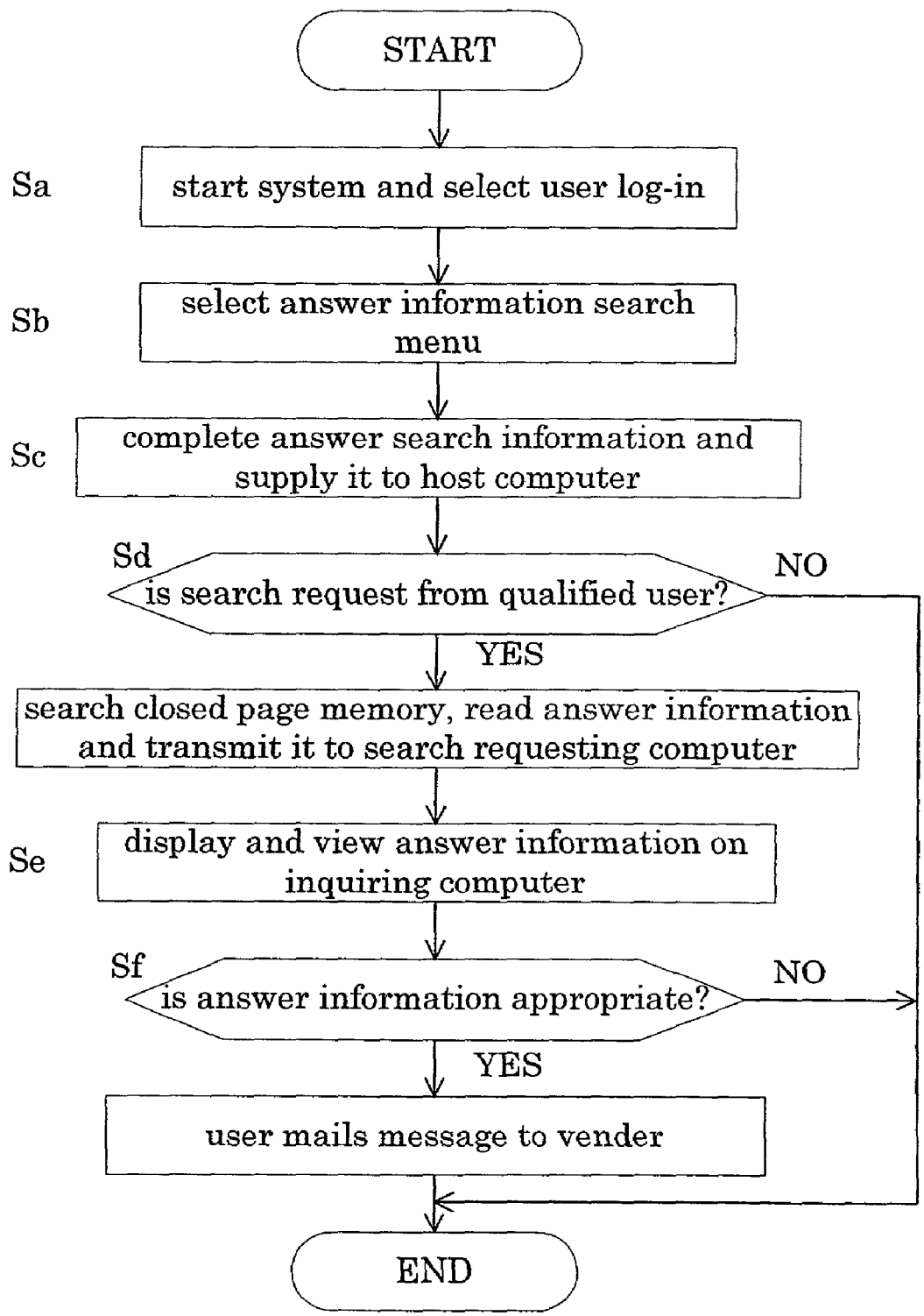
FIG. 16 is a flow chart of an answer information retrieval process.

The answer information retrieval process will be described next. FIG. 16 is a flow chart of the answer information retrieval process.

[Step Sa] As when inputting the inquiry information, the user connects the inquiring computer 1 to the host computer 3, carries out a user log-in, and causes the user page menu screen P3 to be displayed on the screen display unit 6.

[Step Sb] The user selects the answer information search menu on the user page menu screen P3 to cause the answer information search screen P6 to be displayed on the screen display unit 6.

[Step Sc] The user inputs necessary matters on the answer information search screen P3. Answer search information completed is supplied to the host computer 3 through the communication line 4.

[Step Sd] The host computer 3 determines whether the user having supplied the answer search information is the same user having supplied the inquiry information QA. When the user is one and the same, a search is made to read the answer information QB corresponding to the inquiry information QA from the closed page memory 11c. The answer information QB is transmitted to the inquiring computer 1 through the communication line 4.

[Step Se] The screen display unit 6 of inquiring computer 1 displays the answer search result display screen P11 showing the answer information QB transmitted from the host computer 3.

[Step Sf] The user viewing the answer information QB determines whether the answer information QB is appropriate or not. When the answer information QB is appropriate, the user mails a message to the vender. Otherwise, the user terminates the answer information retrieval process without mailing a message.

In the scientific information inquiry-answer system of this embodiment, as particularly described hereinbefore, inquiry information QA used is limited to topics in the scientific fields, and answer information QB is obtained by inputting such inquiry information and answer search information from the inquiring computer 1. Thus, answer information may be obtained efficiently. Further, when inputting open inquiry information which requires no security protection, the information is indicated as such and applied to both inquiring and answering computers 1 and 2. Inquiry information requiring security protection is indicated as such and applied only to the answering computer 2. Thus, security is considered for the party presenting the inquiry information.

In the system of the above embodiment, inquiry information QA is classified according to open/closed and inquirer, and is stored in the open page memory 11b or closed page memory 11c. Moreover, answer information QB is stored in the open page memory 11b or closed page memory 11c as associated with the inquiry information answered. Thus, it is extremely easy to retrieve inquiry information as classified according to open/closed or inquirer, or to retrieve answer information as associated with particular inquiry information.

This invention is not limited to the above embodiment but may be modified as follows:

(1) In the above embodiment, inquiry information is hierarchized according to user and stored in the applicable user memory 14, and answer information corresponding to the inquiry information is further hierarchized according to vender and stored in the applicable vender memory 15. For example, answer information may be hierarchized according to vender, and further hierarchized according to user.

Figure 17:
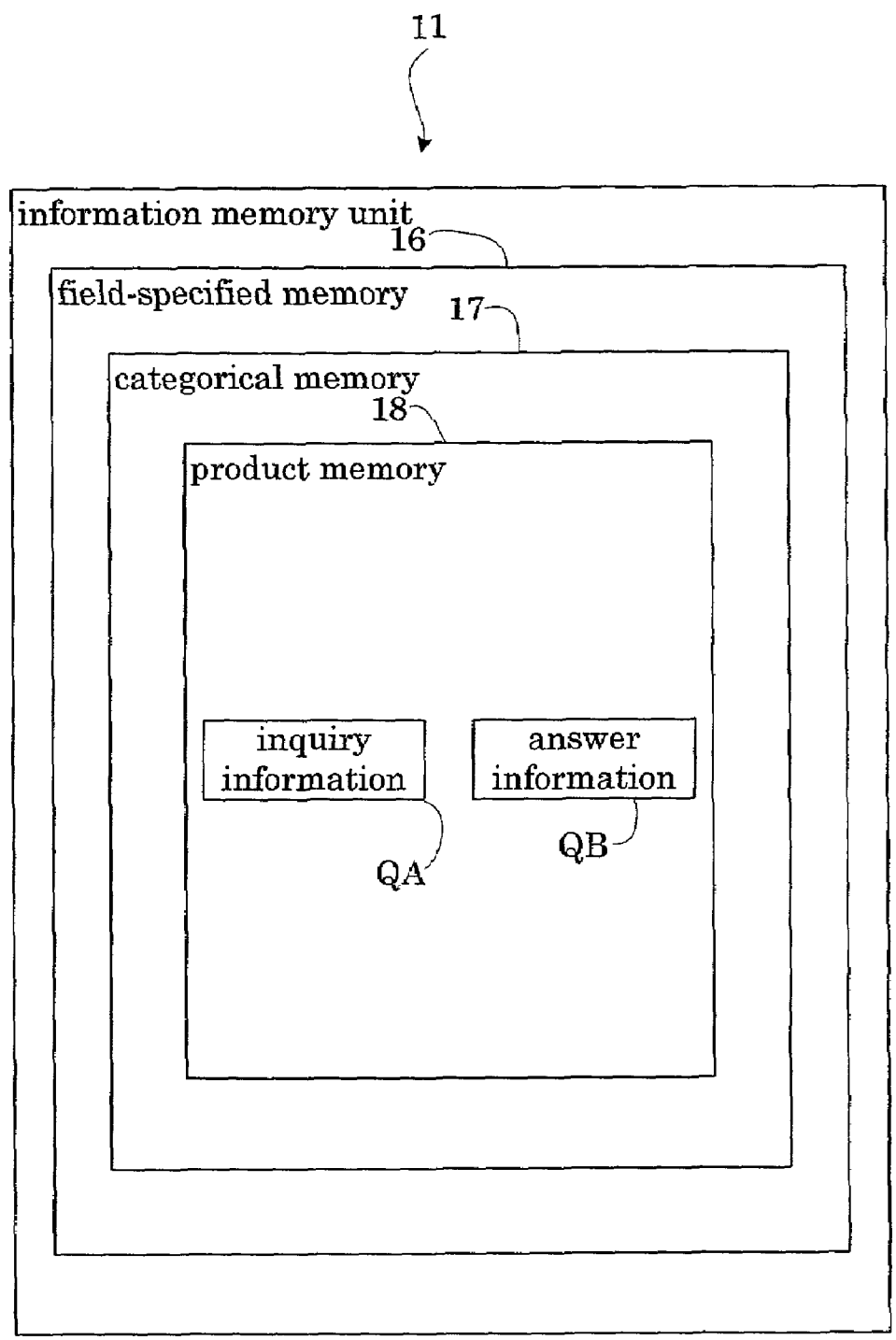
FIG. 17 is a schematic view of a modified information memory in the host computer.

(2) In the above embodiment, inquiry information and answer information are stored as hierarchized according to user and vender. For example, inquiry information and answer information may be hierarchized according to field, category and product. That is, as shown in FIG. 17, inquiry information and answer information may be stored in a field-specified memory 16, a categorical memory 17 and a product memory 18 hierarchized in the stated order within the information memory unit 11. The invention is not limited to a particular way of storing inquiry information and answer information.

The present invention may be embodied in other specific forms without departing from the spirit or essential attributes thereof and, accordingly, reference should be made to the appended claims, rather than to the foregoing specification, as indicating the scope of the invention.

What is claimed is:

1. A scientific information inquiry-answer system comprising an inquiring computer for presenting, as distinguished between open and closed to third parties, inquiry information concerning scientific information which is information relating to scientific fields, and viewing the inquiry information and answer information, an answering computer for viewing the inquiry information and answer information and offering the answer information, and a host computer for storing the inquiry information and answer information, the computers being interconnected through communication lines, wherein:

said inquiring computer includes first display/input means for inputting the inquiry information as distinguished between open and closed, inquiry search information for searching inquiry information, and answer search information for searching answer information, and displaying the inquiry information and answer information;

said answering computer includes second display/input means for inputting the answer information, answer search information and inquiry search information, and displaying the inquiry information and answer information;

said host computer includes open/closed determining means for determining a distinguishment between open and closed to third parties of the inquiry information and answer information, information storing means for storing the inquiry information supplied from the inquiring computer and the answer information supplied from the answering computer, and information retrieving means for retrieving answer information, based on the answer search information, from among the answer information stored, and retrieving inquiry information, based on the inquiry search information, from among the inquiry information stored;

said inquiring computer supplying the inquiry information, inquiry search information and answer search information inputted by said first display/input means to said host computer through one of said communication lines;

said answering computer supplying the answer information, answer search information and inquiry search information inputted by said second display/input means to said host computer through the other communication line;

said host computer applying, through the communication lines, inquiry information indicated open to said inquiring and answering computers, applying inquiry information indicated closed only to said inquiring computer having inputted the inquiry information and to said answering computer without applying such inquiry information to a third party inquiring computer, and applying answer information retrieved based on the answer search information to one of the inquiring computer and the answering computer having inputted the answer search information;

said host computer further applying answer information indicated open to said inquiring and answering computers, applying answer information indicated closed only to said inquiring computer having inputted the inquiry information and to said answering computer having inputted the answer information, without applying such answer information to third party inquiring and answering computers, and applying inquiry information retrieved based on the inquiry search information to said inquiring and answering computers;

said answering computer displaying the inquiry information and answer information applied thereto for viewing; and said inquiring computer displaying the inquiry information and answer information applied thereto for viewing.

2. A scientific information inquiry-answer system as defined in claim 1, wherein said scientific information is software information which is information on software for use in scientific fields, and said inquiry information and answer information are information on said software information.

3. A scientific information inquiry-answer system as defined in claim 1, wherein said scientific information is information on academic societies, and said inquiry information and answer information are information on said information on academic societies.

4. A scientific information inquiry-answer system as defined in claim 1, wherein said scientific information is information on exhibitions, and said inquiry information and answer information are information on said information on exhibitions.

5. A scientific information inquiry-answer system as defined in claim 1, wherein said scientific information is information on advertisements, and said inquiry information and answer information are information on said information on advertisements.

6. A scientific information inquiry-answer system as defined in claim 1, wherein said scientific information is information on machinery and equipment, and said inquiry information and answer information are information on said information on machinery and equipment.

7. A scientific information inquiry-answer system as defined in claim 1, wherein said host computer includes translating means for translating the scientific information into different languages.

8. A scientific information inquiry-answer system as defined in claim 1, wherein said information storing means of said host computer includes an open information storage area for storing inquiry information and answer information indicated open, and a closed information storage area for storing inquiry information and answer information indicated closed, the inquiry information and answer information being distributed to said open information storage area and said closed information storage area in response to results of distinguishment made between open and closed by said open/closed determining means, the inquiry information stored in each of said open information storage area and said closed information storage area being classified according to inquirer, the answer information being stored in the information storage area where the inquiry information to be answered is stored, and associated with the inquiry information to be answered.

9. A scientific information inquiry-answer system as defined in claim 8, wherein said information storing means stores the inquiry information as hierarchized according to each user having inputted the inquiry information, the inquiry information indicated closed and stored in said closed information storage area of the information storage means as hierarchized according to the user being applied, based on the inquiry search information inputted by the first and second display/input means from said answering computer and said inquiring computer of the user having inputted the inquiry information indicated closed, only to said answering computer and said inquiring computer without being applied to third party inquiring computers.

10. A scientific information inquiry-answer system as defined in claim 8, wherein said information storing means stores the answer information as hierarchized at two levels of each user having inputted the inquiry information and a vender having inputted the answer information for said inquiry information, the answer information indicated closed and stored in said closed information storage area of the information storage means as hierarchized according to the user and the vender being applied, based on the answer search information inputted by the first and second display/input means from said inquiring computer of the user having inputted the inquiry information indicated closed, and said answering computer of the vender having inputted the answer information for the inquiry information indicated closed, only to said inquiring computer and said answering computer without being applied to third party inquiring and answering computers.

11. A scientific information inquiry-answer system as defined in claim 1, wherein said information storing means stores the inquiry information and answer information as hierarchized at three levels of field, category and product.

12. A scientific information inquiry-answer system as defined in claim 1, wherein each of said first and second display/input means comprises an information screen for displaying the inquiry information and answer information, said information screen being started and a log-in made by input operations through a keyboard and a mouse, a determination being made from the log-in inputted on said information screen whether the computer having started said information screen is the inquiring computer or the answering computer.

13. A host computer for use in the scientific information inquiry-answer system defined in claim 1, comprising: open/closed determining means for determining a distinguishment between open and closed to third parties of the inquiry information and answer information;

information storing means for storing the inquiry information supplied from the inquiring computer and the answer information supplied from the answering computer; and information retrieving means for retrieving answer information, based on the answer search information, from among the answer information stored, and retrieving inquiry information, based on the inquiry search information, from among the inquiry information stored.

14. An inquiring computer for use in the scientific information inquiry-answer system defined in claim 1, comprising first display/input means for inputting the inquiry information as distinguished between open and closed, inquiry search information for searching inquiry information, and answer search information for searching answer information, and displaying the inquiry information and answer information.

15. An inquiring computer as defined in claim 14, wherein said first display/input means comprises an information screen for displaying the inquiry information and answer information, said information screen being started by an input operation through a keyboard and a mouse to display the inquiry information and answer information for viewing.

16. An inquiring computer as defined in claim 15, wherein said information screen includes open/closed boxes for designating an open/closed status, one of said open/closed boxes being selected by operating the keyboard and mouse, when the inquiry information is inputted, to determine an open/closed status of the inquiry information.

17. An inquiring computer as defined in claim 15, wherein a search is made for inquiry information matching inquiry search information inputted on said information screen by operating the keyboard and mouse, and search results are displayed on said information screen.

18. An inquiring computer as defined in claim 15, wherein a search is made for answer information matching answer search information inputted on said information screen by operating the keyboard and mouse, and search results are displayed on said information screen.

19. An inquiring computer as defined in claim 15, wherein said information screen includes an inquiry information input box for inputting inquiry information, an answer information search box for searching answer information based on answer search information, and an inquiry information search box for searching inquiry information based on inquiry search information, said boxes being selectable by operating the keyboard and mouse to input the inquiry information and search the answer and inquiry information.

* * * * *